United States Patent [19]
Cohen

[11] Patent Number: 5,947,795
[45] Date of Patent: Sep. 7, 1999

[54] ADJUSTABLE AXLE MOUNTING ASSEMBLY FOR CHILDREN'S RIDE-ON VEHICLES

[75] Inventor: Samuel L. Cohen, Fort Wayne, Ind.

[73] Assignee: Mattel, Inc., El Segundo, Calif.

[21] Appl. No.: 08/924,925

[22] Filed: Sep. 8, 1997

Related U.S. Application Data

[63] Continuation of application No. 08/586,561, Jan. 16, 1996, abandoned.

[51] Int. Cl.$^6$ .................................................. A63H 17/26
[52] U.S. Cl. .......................... 446/469; 301/125; 296/177; 296/197; 296/901
[58] Field of Search ................................ 301/1, 5.1, 111, 301/125, 126, 131, 132; 180/905; 280/111, 112.1, 1.208, 827, 828; 296/177, 196, 197, 203, 204, 35.3, 901; 16/31 R, 40; 446/465, 469

[56] References Cited

U.S. PATENT DOCUMENTS

| Re. 33,769 | 12/1991 | Harrod | 296/177 |
|---|---|---|---|
| 3,437,161 | 4/1969 | Ufford | 180/1 |
| 3,718,344 | 2/1973 | Lohr et al. | 280/261 |
| 4,403,671 | 9/1983 | Schmahl | 180/53 R |
| 4,422,685 | 12/1983 | Bonfilio et al. | 296/197 |
| 4,573,941 | 3/1986 | Holden et al. | 446/451 |
| 4,709,958 | 12/1987 | Harrod | 296/177 |
| 4,811,970 | 3/1989 | Cassese | 280/788 |
| 4,850,929 | 7/1989 | Genevey | 446/466 |
| 4,893,832 | 1/1990 | Booher | 280/719 |
| 4,940,442 | 7/1990 | Matsuda | 446/90 |
| 5,071,384 | 12/1991 | Poulsen | 446/103 |

Primary Examiner—Russell D. Stormer
Attorney, Agent, or Firm—Kolisch Hartwell Dickinson McCormack & Heuser

[57] ABSTRACT

A child's ride-on vehicle including a molded plastic body member with a wheel-mounting assembly including a frame member. The wheel-mounting assembly is mountable to the body member with the frame member adjacent the body member. A tongue extends downwardly from the body member to be received by a pocket formed in the frame member so that the tongue fits into the pocket as the wheel-mounting assembly is mounted to the body member, with the tongue fitting closely within the pocket when the wheel-mounting assembly is mounted to the body member, the tongue and pocket thereby establishing alignment between the wheel-mounting assembly and the body member.

14 Claims, 6 Drawing Sheets

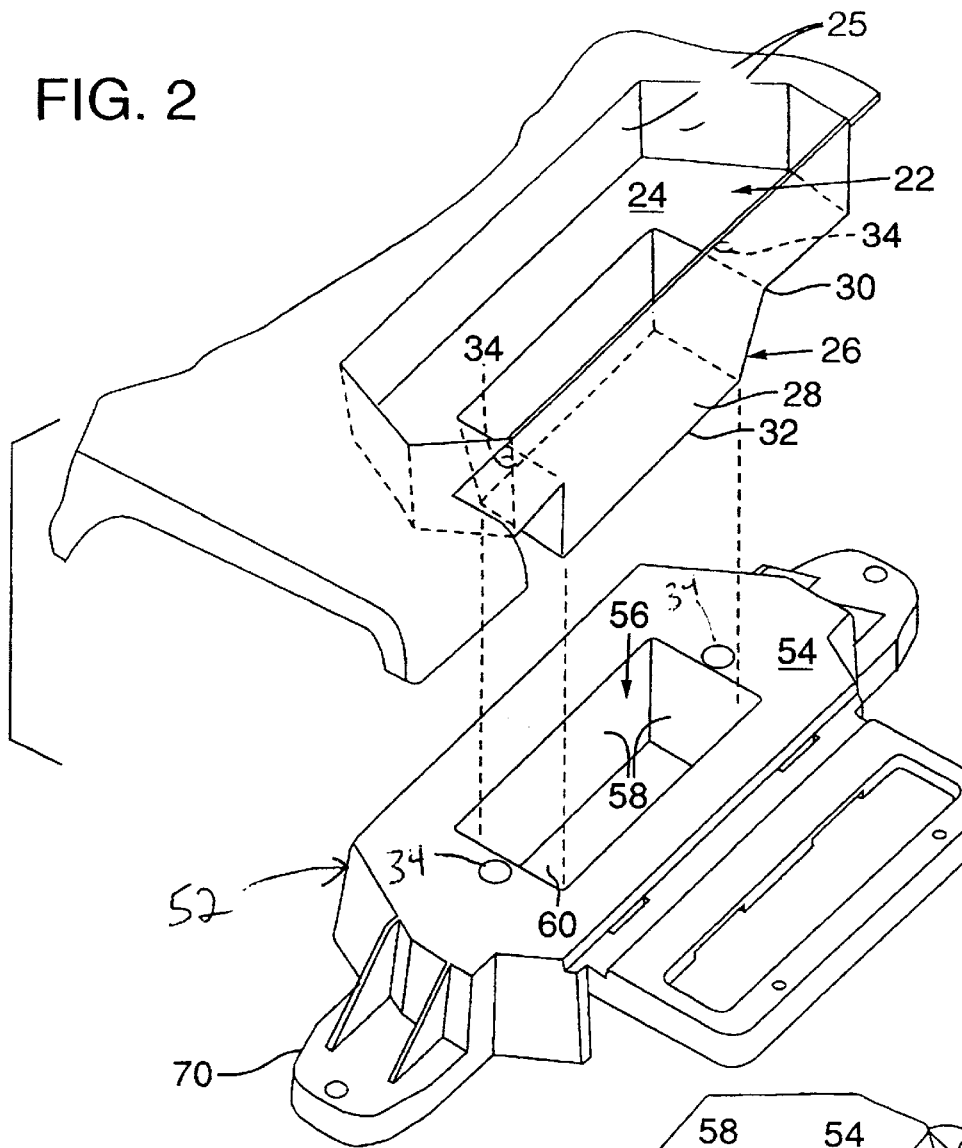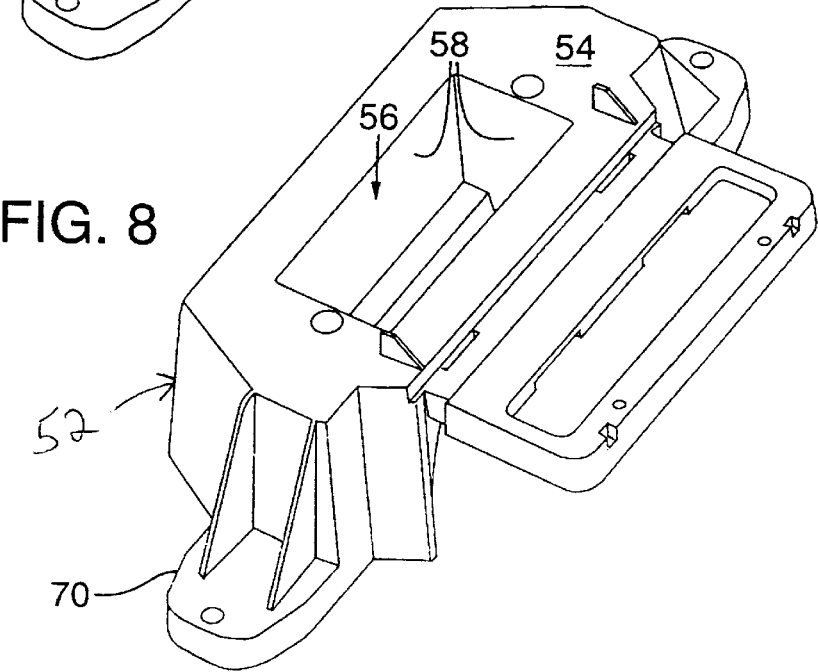

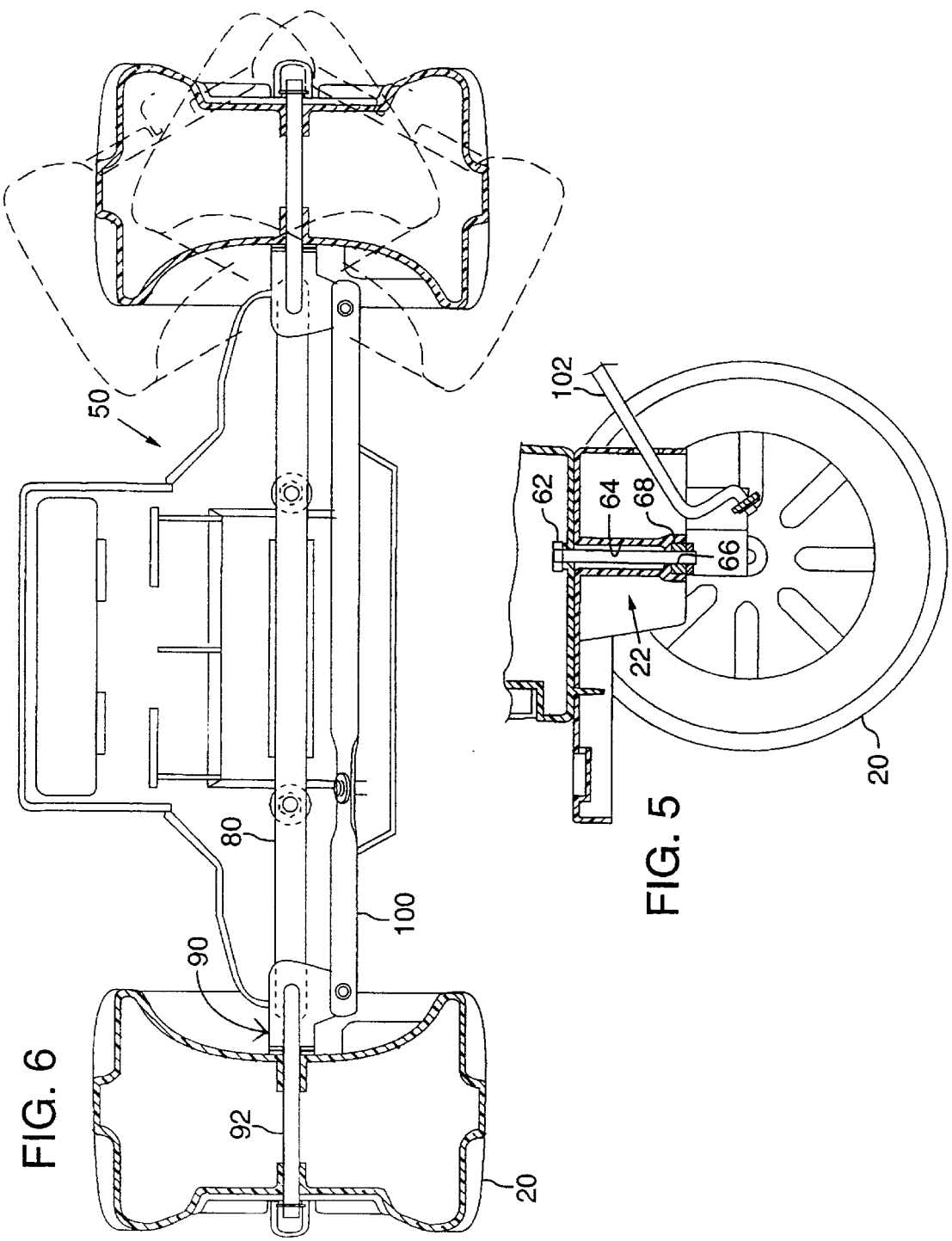

5,947,795

ADJUSTABLE AXLE MOUNTING ASSEMBLY FOR CHILDREN'S RIDE-ON VEHICLES

This application is a continuation of Ser. No. 08/586,561 filed Jan. 16, 1996, now abandoned.

FIELD OF THE INVENTION

The present invention relates to children's ride-on vehicles, and more particularly to a wheel-mounting assembly for use on such a vehicle to accommodate different-sized wheels and provide easy assembly.

BACKGROUND OF THE INVENTION

Children's ride-on vehicles come in many different shapes and sizes. In addition to varying in shape and size, the vehicles often vary in theme. For example, Mattel, Inc. designs and manufactures a number of these ride-on vehicles having varied shapes, sizes, and themes. Vehicles for children between the ages of 3–7 years who weigh up to 130 lbs include the Jeep® Sand Blaster®; vehicles designed for children between the ages of 3–7 years who weigh up to 65 lbs. include the Suzuki® Quad Racer® 900; and, vehicles designed for children between the ages of ½–6 years who weigh up to 50 lbs. include the Lil Sand Blaster®, to name just a few.

While each of these vehicles is unique insofar as size, shape and theme are concerned, there are similarities among some designs which enable the manufacture of a single component or components which may be used interchangeably among different vehicles. Using the same component on multiple types of vehicles saves engineering costs as well as reduces manufacturing expense through economies of scale. For example, the manufacturer need only assemble one type of electrical system which may then be incorporated into different vehicles. As a general rule, it is desirable to maximize the interchangeability of the parts among various vehicle designs.

In addition to the three general types of vehicles listed above, a number of variations of each type are also manufactured. For example, there are several different models based on the basic Jeep® body style, with each model incorporating different accessories to create a different appearance. One accessory that changes from model to model is the wheel size. An off-road style jeep, for instance, might incorporate larger wheels and greater ground clearance. As a result, the undercarriage which provides a mount for these wheels varies between and among the vehicles, which increases the cost of the design and the time spent assembling the vehicle. Thus, a significant need exists for standardizing the undercarriages of different-sized children's ride-on vehicles so that manufacture and assembly of the vehicles may be made more efficient and the cost thereof reduced.

With the above problems in mind, it is a general object of the present invention to provide a novel wheel-mounting assembly that can be adapted to accommodate different-sized wheels without modification of the body of the vehicle.

It is another object of the present invention to provide a wheel-mounting assembly which may be used in more than one type or model of ride-on vehicle.

One more object of the present invention is to provide an assembly that achieves the above results and yet is economical to manufacture by virtue of having relatively few parts and is readily moldable from plastic.

An additional object of the invention is to provide a wheel-mounting assembly that does not require precisely manufactured parts and is easily attached to the rest of the vehicle.

Yet another object of the invention is to provide a structure that is rugged enough to tolerate the abuses expected in the operating environment.

SUMMARY OF THE INVENTION

These and other objects are satisfied by providing a child's ride-on vehicle including a molded plastic body member with a wheel-mounting assembly which includes a frame member. The wheel-mounting assembly is mountable to the body member with the frame member adjacent the body member. A tongue extends downwardly from the body member to be received by a pocket formed in the frame member so that the tongue fits into the pocket as the wheel-mounting assembly is mounted to the body member. The tongue fits closely within the pocket when the wheel-mounting assembly is mounted to the body member, the tongue and pocket thereby establishing alignment between the wheel-mounting assembly and the body member.

Many other features, advantages and additional objects of the present invention will become manifest to those versed in the art upon making reference to the detailed description which follows and the accompanying sheets of drawings in which preferred embodiments incorporating the principles of this invention are disclosed as illustrative examples only.

BRIEF DESCRIPTION OF THE DRAWINGS

FIG. 2 is a perspective view of the front of a body member and frame member according to the present invention.

FIG. 5 is a sectional view of FIG. 3 along line 5—5.

FIG. 6 is a elevational view of FIG. 3 along line 6—6.

FIG. 8 is a perspective view of the front of a body member and frame member with a taller frame.

DETAILED DESCRIPTION OF THE PREFERRED EMBODIMENT

Figure 1:
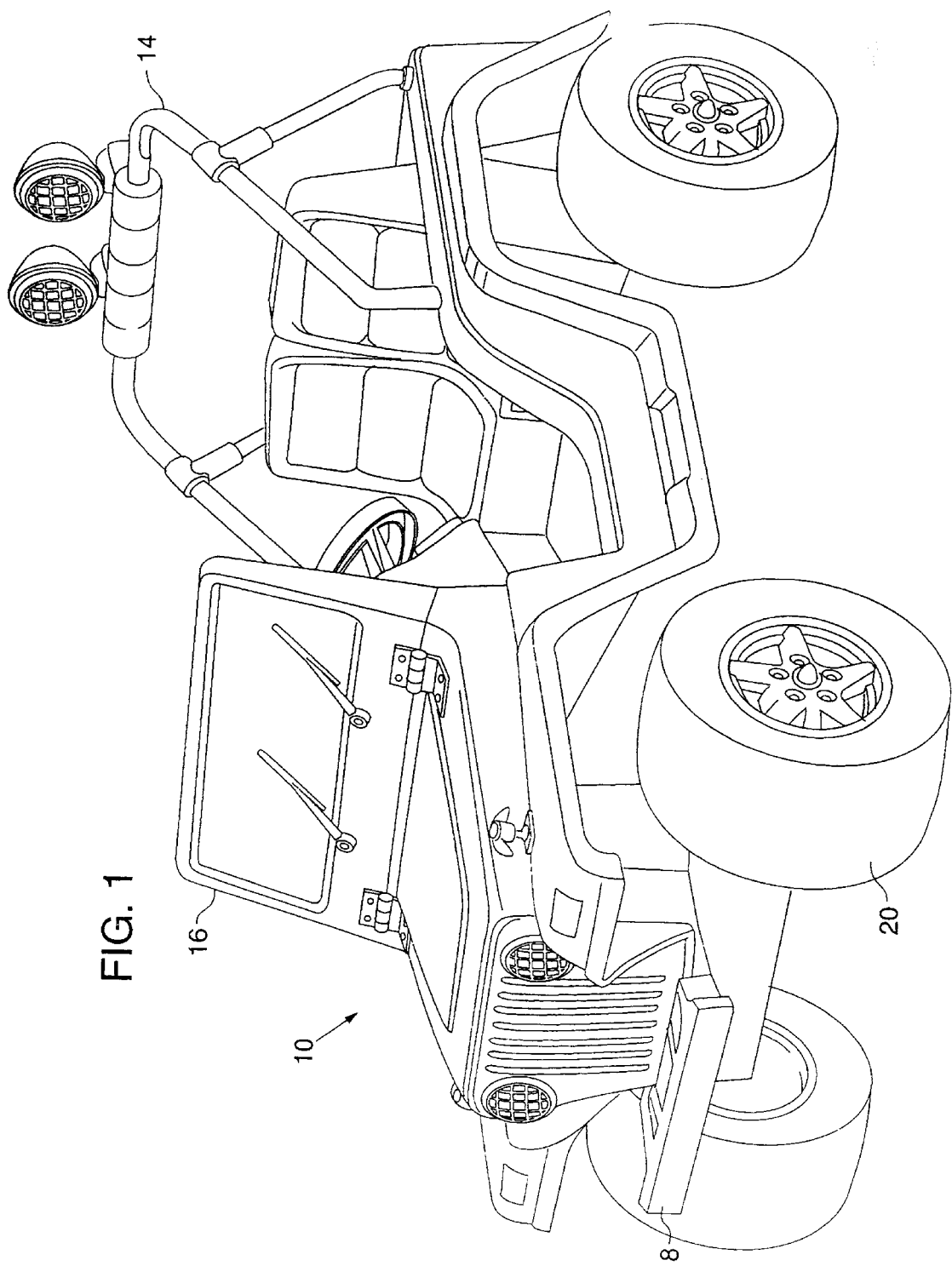
FIG. 1 is a perspective view of a ride-on vehicle constructed according to the present invention. The grille depicted on the front of the vehicle in the Figure is a registered trademark of Chrysler Corporation.

A ride-on vehicle constructed according to the present invention is shown generally at 10 in FIG. 1. The grille depicted on the front of the vehicle in FIG. 1 is a registered trademark of Chrysler Corporation. Vehicle 10 includes a body member 12 which is preferably formed as a unitary structure from molded plastic. Various accessories are attached to body 12, such as roll bar 14, windshield 16, bumper 18 and wheels 20. It should be noted that positional references in the following description will be made assuming that the vehicle is in an upright position.

As shown in FIG. 2, a cavity 22 is formed in the front region of body 12. Cavity 22 projects downwardly from the surrounding body and includes a flat bottom 24 and walls 25 defining a perimeter of the cavity. A box-like hollow alignment tongue 26 extends downwardly from the bottom of the cavity. Tongue 26 includes an outer surface 28 which tapers from a larger rectangular cross-section at a base 30 adjacent bottom 24 to a smaller rectangular cross-section at a tip 32.

In particular, the outside dimensions of the cross-section of the tongue in the preferred embodiment are approximately 6⅝×2⅜ inches at the tip, and 7⅛×2⅞ inches at the base, with the tongue being approximately 2⅞ inches long. This geometry corresponds to a taper angle of approximately 5-degrees for each side of the tongue, although taper angles between 2- and 30-degrees would probably be suitable. It is expected that the dimensions of the cross-section of the tongue at the base could be anywhere between 1×4 inches and 8×24 inches. A pair of holes 34 are formed in bottom 24 generally adjacent the lateral edges of tongue 26.

A wheel-mounting assembly 50 is mounted to the body in the lower front region to secure the front two wheels 20 to the body. See FIGS. 2 and 3. Wheel-mounting assembly 50 includes a frame member 52 which is preferably molded as a single piece from plastic for durability and economy. Frame 52 includes a flat upper surface 54 from which an alignment pocket 56 extends downwardly. Pocket 56 includes an inside surface 58 tapering from a larger rectangular cross-section near upper surface 54 to a smaller rectangular cross-section near a bottom 60 of the pocket.

Pocket 56 and tongue 26 can, together, be considered an alignment mechanism to facilitate assembly of the vehicle. The alignment mechanism guides the alignment of the wheel-mounting assembly and body member as they are brought together during assembly of the vehicle. As the body and wheel-mounting assembly are brought together, the tongue fits into the pocket to guide the body and wheel-mounting assembly into proper relative position to each other. Because pocket 56 is intended to receive tongue 26 as the vehicle is assembled, the inside dimensions of the pocket are formed to match the outside dimensions of tongue 26.

The taper in tongue 26 and pocket 56 significantly facilitates assembly of the vehicle, thereby reducing the cost of assembly. Because the outside dimensions of the tongue at the tip are approximately ½ inch less than the inside dimensions of the pocket at the top, there is approximately ¼ of an inch of play between the lower end of the tongue and the edges of the pocket at the upper end as the lower end of the tongue first enters the pocket. This play makes the initial positioning of the parts for assembly non-critical, and therefore reduces the time required to achieve proper positioning. In addition, the lower outside edges of tongue 26 are rounded to a radius of approximately ¼ of an inch, which further facilitates mating of the tongue and pocket. As the tongue is inserted further into the pocket, the taper of the two pieces causes them to fit more closely, thereby aligning the parts so that their final position is automatically and accurately established.

It should be noted that the tongue, by virtue of tapering both laterally (side-to-side) and longitudinally (front-to-back), provides alignment correction for misalignment of the body relative to the frame laterally, longitudinally and rotationally. Moreover, because of the large size of the tongue and pocket, once mated, they provide a significant portion of structural support needed to maintain the body and frame in alignment during use of the vehicle. Thus, the tongue and pocket arrangement described above provides structural benefits during use as well as saving assembly labor.

Figure 4:
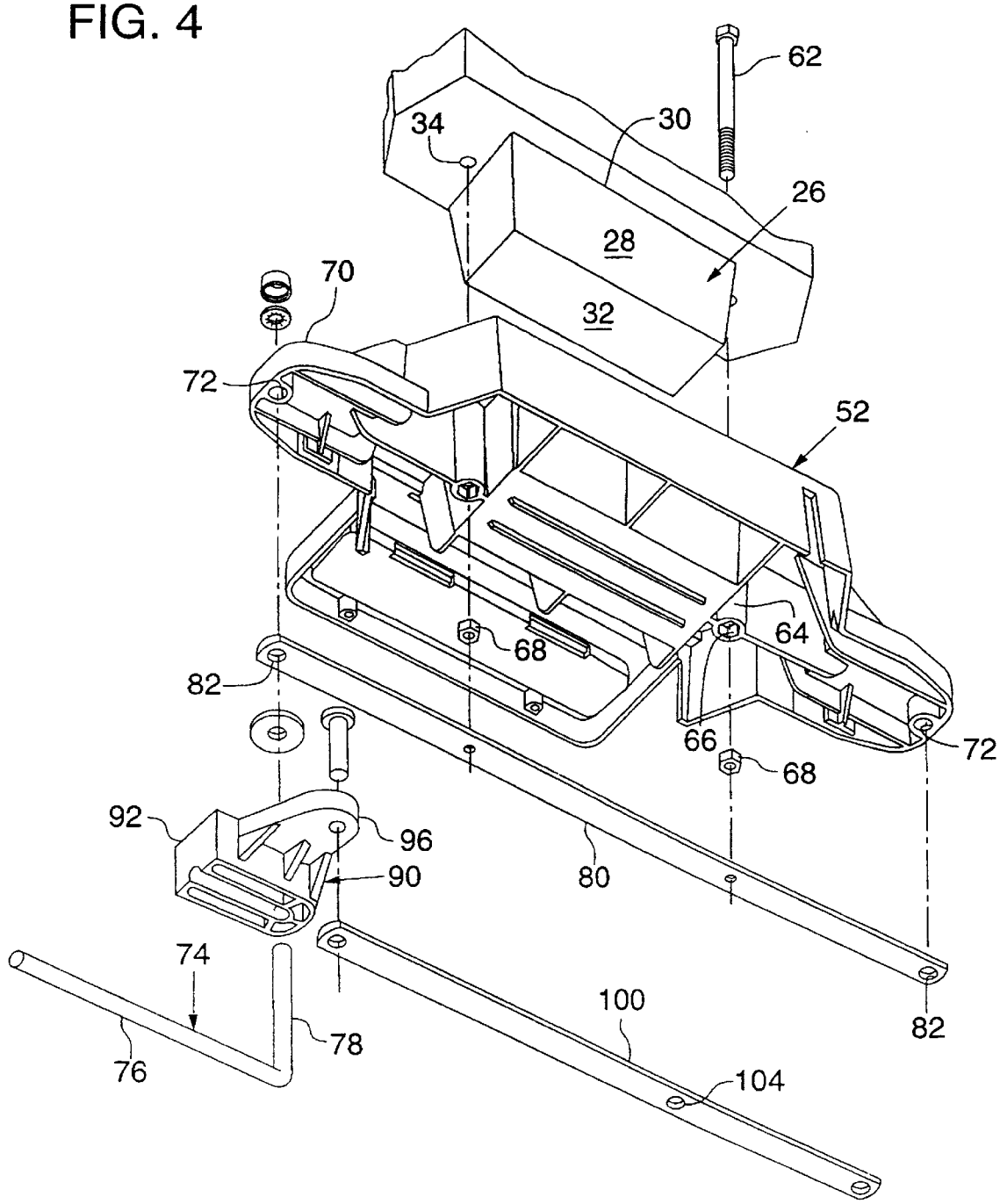
FIG. 4 is an exploded view of the wheel-mounting assembly and tongue of FIG. 3.

Because of the significant alignment support provided by the described tongue and pocket arrangement, the wheel-mounting assembly can be adequately secured to body 12 by only two bolts 62. As shown in FIGS. 4 and 5, bolts 62 pass down through holes 34 in the bottom of cavity 22 and into bolt passages 64 which extend from the top to the bottom of frame 52. A nut receptacle 66 is formed at the bottom of each passage to hold a nut 68 which is pressed therein prior to assembly of the parts. See FIG. 4. Because the nuts are installed prior to assembly of the parts, the person joining the wheel-mounting assembly to the body need only place the body on the wheel-mounting assembly, install the bolts and drive them into the nuts to attach the wheels to the body.

Because the two sides of wheel-mounting assembly 50 are symmetrical, the following description will be made with reference to the left side. See FIG. 4. A spindle support flange 70 extends from the lower lateral edge of frame 52. A vertical hole 72 is formed in the lateral end of flange 70 to receive an L-shaped spindle 74. Spindle 74 is preferably formed of a section of metal rod with a 90-degree bend along its length. As positioned in the frame, the wheel rides on a horizontal portion 76 of the spindle, with a vertical portion 78 forming a pivot axis for steering.

Figure 3:
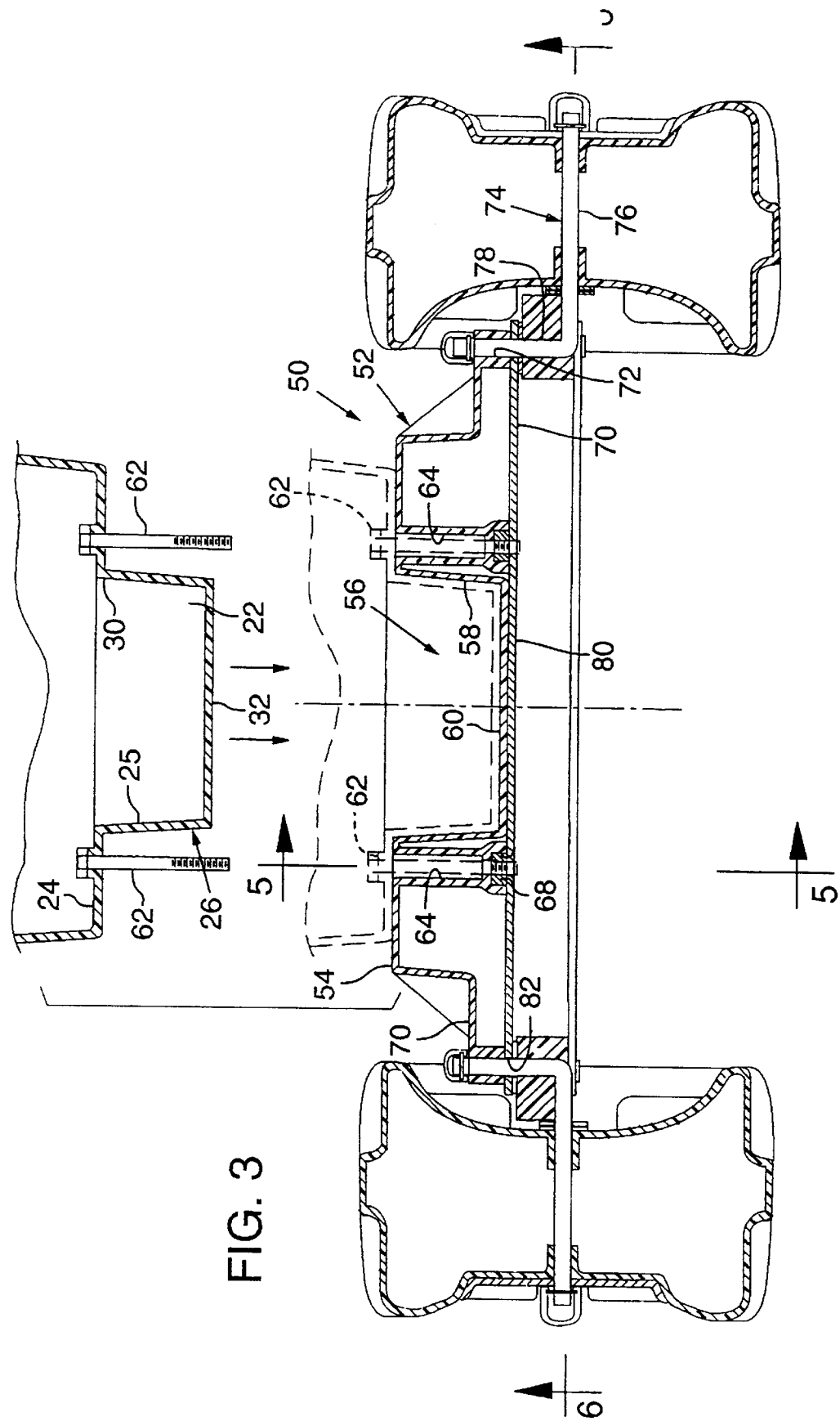
FIG. 3 is a cross-sectional view through a wheel-mounting assembly and tongue according to the present invention.

As shown in FIGS. 3, 4 and 6, a cross brace 80 is mounted to wheel-mounting assembly 50 on the bottom side of frame 52. Cross brace 80 extends between the spindles on each side of the vehicle and includes holes 82 at each end through which the spindles pass. Because the weight of the vehicle is transferred to the ground at approximately the lateral center of the tire, which is offset from where the spindle is mounted to the frame, a significant torque is created on the spindle when the vehicle is fully loaded. Cross brace 80 provides additional support to the frame to prevent the spindles from flexing the frame when the vehicle is heavily loaded. Cross brace 80 also covers the nut receptacles to prevent the nuts from escaping prior to attachment of the wheel-mounting assembly to the vehicle body.

A bell crank 90 is mounted to each spindle to allow the spindles to be pivoted for steering. See FIG. 6. The bell crank includes a spindle arm 92, to fit over the horizontal portion of the spindle between the inside edge of the wheel and the 90-degree bend, and a steering arm 96 extending back toward the rear of the vehicle. A tie rod 100 extends between the steering arms on the bell cranks on each side to connect the wheels. Tie rod 100 is driven side-to-side to steer the wheels by a steering crank 102 which fits through a hole 104 formed in the tie rod between the ends.

The above-described steering geometry locates the steering pivot axis for the wheels near the inside edge of the wheels. By locating the steering pivot axis near the wheel, the forward and back travel of the wheel as it is turned to steer the vehicle is reduced relative to what it would be if the pivot axis were closer to the center of the vehicle. Because the wheel does not travel as far forward and backward during steering, the clearance between the wheels and the fenders can be reduced. Alternatively, larger wheels may be used without increasing the fender opening.

Figure 7:
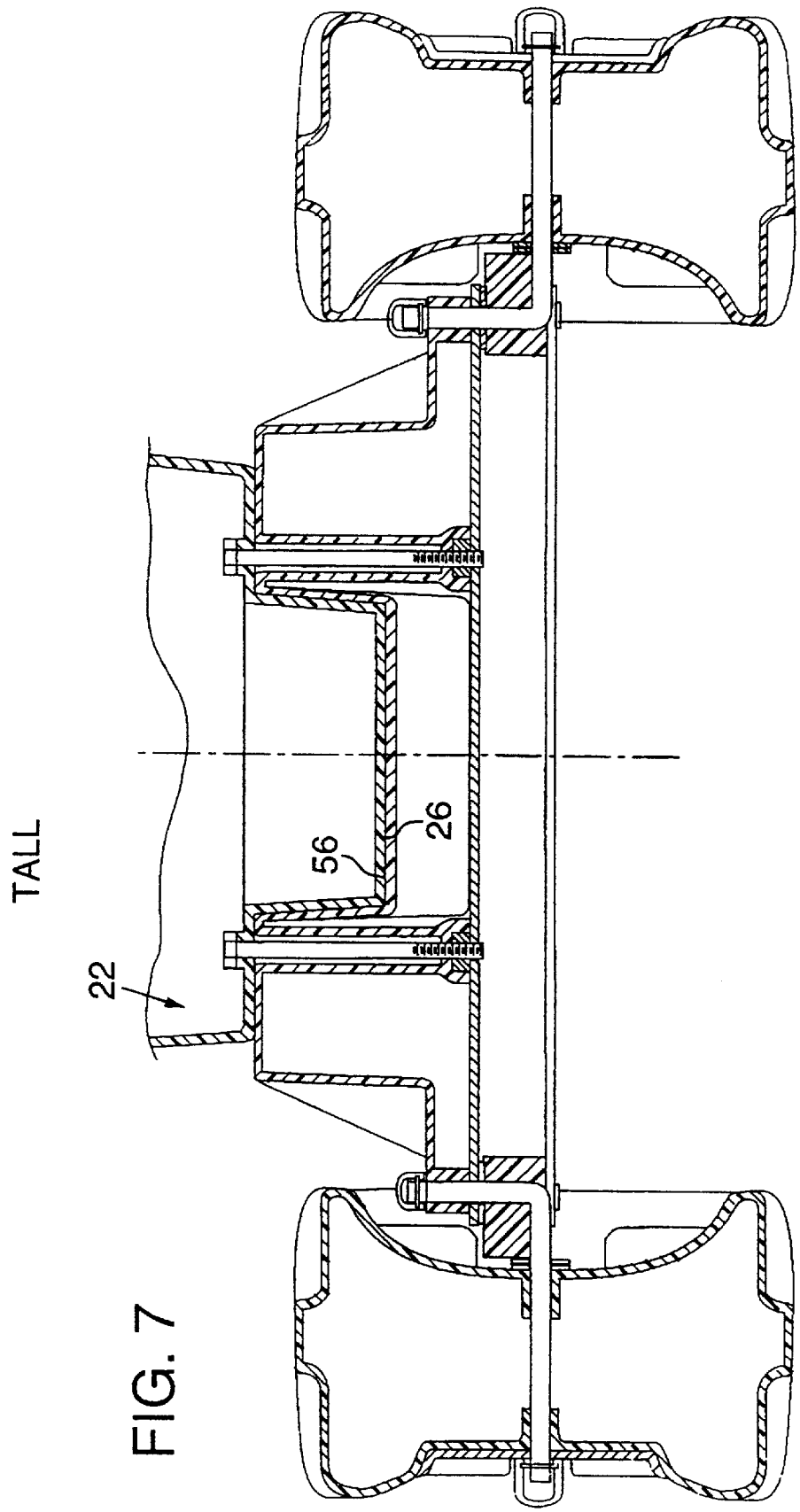
FIG. 7 is a cross-sectional view through a wheel-mounting assembly and tongue with a taller frame.

As shown in FIGS. 7 and 8, it is possible to make frame 52 taller to provide greater ground clearance or to allow larger tires to be used. The frame shown in FIG. 8, for instance, is approximately 1¾ inches taller than the frame previously described. A taller frame may be used to incorporate larger tires, increase ground clearance or both.

The above-described wheel-mounting assembly reduces engineering and manufacturing costs because one assembly can be incorporated in various body types. Moreover, various assemblies can be formed with different heights to accommodate different-sized wheels or provide more or less ground clearance, as described above. In either case, the present invention allows both bodies and wheel-mounting assemblies to be used interchangeably on different types and models of vehicles, thus providing significant savings.

It will be appreciated that the wheel-mounting assembly of the present invention may be used on either the front or back (or both) of a riding vehicle, and that the riding vehicle may or may not be motorized.

While the present invention has been shown and described with reference to the foregoing preferred embodiment, it is to be understood by those of skill in the art that other changes in form and detail may be made therein without departing from the spirit and scope of the invention as defined in the appended claims.

It is claimed and desired to secure by Letters Patent:

1. A child's ride-on vehicle comprising:

a molded plastic body member;

a wheel-mounting assembly including a frame member, the wheel-mounting assembly being mountable to the body member with the frame member adjacent the body member; and a tongue joined to one of the members and a pocket joined to the other member so that the tongue fits into the pocket to guide the body member and wheel-mounting assembly into proper fixed position with respect to each other as the wheel-mounting assembly is mounted to the body member, with a substantial portion of the tongue fitting closely within the pocket when the wheel-mounting assembly is mounted to the body member, the tongue and pocket thereby establishing fixed alignment between the wheel-mounting assembly and the body member, even if the tongue and pocket are slightly out of alignment prior to the tongue being inserted into the pocket, wherein when in fixed alignment with each other, the tongue and the pocket are at least substantially immobile with respect to each other.

2. The vehicle of claim 1, wherein the tongue is generally box-like and has a base adjacent the member to which it is joined and a tip opposed to the base, the cross-section of the tongue near the base that is received within the pocket being larger than the cross-section of the tongue near the tip that is received within the pocket, and wherein the pocket is shaped to have an inner surface that generally matches the dimensions of the tongue.

3. The vehicle of claim 2, wherein the cross-section of the tongue is generally rectangular, with a box-like outer surface that is received within and configured to mate with the inner surface of the pocket.

4. The vehicle of claim 3, wherein the cross-section of the tongue near the base is between 1×4 inches and 8×24 inches.

5. The vehicle of claim 2, wherein the tongue has an outer surface extending in a generally straight path between the base and the tip, and the taper angle of the outer surface is between 2 and 30 degrees to provide alignment correction for misalignment of the wheel-mounting assembly relative to the frame member.

6. The vehicle of claim 1, wherein the wheel-mounting assembly includes a pair of wheels mounted on a pair of spindles, and the frame includes a pair of spindle support flanges to which the spindles are mounted.

7. The vehicle of claim 1, wherein the wheel-mounting assembly is secured to the body by a pair of bolts, and further wherein when the tongue and the pocket are in fixed alignment with each other, the tongue and the pocket permit each bolt to extend through a hole in the body member into a bolt passage which extends through the frame to a nut receptacle formed in the frame at the end of the bolt passage to thereby secure the tongue and the pocket together in the fixed alignment position.

8. The vehicle of claim 1, wherein the tongue is generally box-like and tapered to allow the pocket to receive the tongue even if the body member and wheel-mounting assembly are slightly out of alignment.

9. A child's ride-on vehicle comprising:

a molded plastic body member with a top, a bottom, a front end, a back end, and lateral sides extending between the ends;

a wheel-mounting assembly including a frame member for mounting to the bottom of the body near the front end, a pair of wheels pivotally attached to the frame and a steering mechanism to couple the pair of wheels so they pivot together to provide steering for the vehicle; and an alignment mechanism for guiding the alignment of the wheel-mounting assembly and body member into a fixed, at least substantially immobile, assembly position relative to each other and for providing alignment correction for misalignment of the body member and the wheel mounting assembly as they are brought together during assembly of the vehicle, with part of the alignment mechanism being attached to the body member and part of the alignment mechanism being attached to the wheel-mounting assembly.

10. The vehicle of claim 9, wherein the alignment mechanism includes a tongue joined to one of the members and a pocket adapted to receive the tongue joined to the other member, and further wherein in the assembly position the tongue and the pocket are at least substantially immovable with respect to each other.

11. The vehicle of claim 10, wherein the tongue is generally box-like and tapered to allow the pocket to receive the tongue even if the body member and wheel-mounting assembly are slightly out of alignment.

12. A child's ride-on vehicle, comprising:

a molded plastic body member;

a wheel-mounting assembly including a frame member, the wheel-mounting assembly being mountable to the body member with the frame member adjacent the body member; and a generally box-like tongue joined to one of the members and having a base adjacent the member to which it is joined, a tip opposed to the base, and walls tapering inwardly from the base to the tip, and a pocket joined to the other member so that the tongue is substantially received within the pocket into a fixed position as the wheel-mounting assembly is mounted to the body member, wherein the cross-section of the tongue near the base that is received within the pocket is larger than the cross-section of the tongue near the tip that is received within the pocket, with the walls fitting closely within the pocket when the wheel-mounting assembly is mounted to the body member, the tongue and pocket thereby establishing alignment between the wheel-mounting assembly and the body member in a fixed position.

13. A child's ride-on vehicle comprising:

a molded plastic body member;

a wheel-mounting assembly including a frame member, the wheel-mounting assembly being mountable to the body member with the frame member adjacent the body member;

a tongue joined to one of the members and having a box-like outer surface with continuous, inwardly tapered walls; and a pocket joined to the other member and having a configuration that substantially corresponds to the shape of the tongue, wherein the walls are substantially received within the pocket to align the wheel-mounting assembly and the body member into a fixed position, even if the assembly and body member are slightly out of alignment prior to the walls being received within the pocket.

14. A child's ride-on vehicle comprising:

a molded plastic body member;

a wheel-mounting assembly including a frame member, the wheel-mounting assembly being mountable to the body member with the frame member adjacent the body member;

a tongue joined to one of the members and having a box-like outer surface with continuous, inwardly tapered walls, wherein the walls include a pair of opposed laterally tapered walls and a pair of opposed longitudinally tapered walls, the walls collectively providing a mechanism for guiding and correcting the alignment of the wheel-mounting assembly; and a pocket joined to the other member and having a configuration that substantially corresponds to the shade of the tongue, wherein the walls are substantially received within the pocket to align the wheel-mounting assembly and the body member as the walls are inserted within the pocket, even if the assembly and body member are slightly out of alignment prior to the walls being received within the pocket.

* * * * *